United States Patent
LeCostaouec

(10) Patent No.: US 12,522,543 B2
(45) Date of Patent: Jan. 13, 2026

(54) METHODS OF FORMING SiAlON IN CARBON/CARBON COMPOSITES

(71) Applicant: GOODRICH CORPORATION, Charlotte, NC (US)

(72) Inventor: Jean-Francois LeCostaouec, Simsbury, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 1018 days.

(21) Appl. No.: 17/591,013

(22) Filed: Feb. 2, 2022

(65) Prior Publication Data

US 2023/0242454 A1 Aug. 3, 2023

(51) Int. Cl.
*C04B 35/83* (2006.01)
*C04B 35/628* (2006.01)
*C04B 35/64* (2006.01)

(52) U.S. Cl.
CPC ........ *C04B 35/83* (2013.01); *C04B 35/62849* (2013.01); *C04B 35/62873* (2013.01); *C04B 35/62886* (2013.01); *C04B 35/64* (2013.01); C04B 2235/3869 (2013.01); C04B 2235/424 (2013.01); C04B 2235/483 (2013.01); C04B 2235/5248 (2013.01)

(58) Field of Classification Search
CPC .............................................. C04B 35/62849
See application file for complete search history.

(56) References Cited

U.S. PATENT DOCUMENTS

| | | | | |
|---|---|---|---|---|
| 4,499,193 A | * | 2/1985 | Phelps | C04B 35/597 501/98.1 |
| 5,079,195 A | * | 1/1992 | Chiang | C04B 37/005 428/408 |
| 5,196,387 A | * | 3/1993 | Ayama | C04B 35/117 501/96.2 |
| 5,376,599 A | | 12/1994 | Oshima et al. | |
| 5,411,762 A | | 5/1995 | Thebault et al. | |
| 5,962,135 A | * | 10/1999 | Walker | C04B 35/83 264/29.4 |
| 5,964,320 A | | 10/1999 | Kato et al. | |
| 7,208,432 B1 | | 4/2007 | Altshuler et al. | |
| 9,272,950 B2 | | 3/2016 | Waghray et al. | |
| 9,850,174 B2 | | 12/2017 | Corman et al. | |
| 10,378,599 B2 | | 8/2019 | Mettrick et al. | |
| 11,046,619 B2 | | 6/2021 | Poteet | |

(Continued)

FOREIGN PATENT DOCUMENTS

| | | |
|---|---|---|
| EP | 0507564 | 10/1992 |
| EP | 1359132 | 11/2003 |

OTHER PUBLICATIONS

European Patent Office, European Search Report dated Jun. 9, 2023 in Application No. 23153047.8.

*Primary Examiner* — Robert A Vetere
(74) *Attorney, Agent, or Firm* — SNELL & WILMER L.L.P.

(57) ABSTRACT

A method of making a carbon-carbon composite may comprise forming a Silicon-Aluminum-Oxygen-Nitrogen (SiAlON) precursor suspension and infiltrating a fibrous preform with the SiAlON precursor suspension. A SiAlON forming heating treatment may be performed on the fibrous preform to form SiAlON particles. The fibrous preform may be densified using chemical vapor infiltration to form a densified fibrous preform.

13 Claims, 7 Drawing Sheets

(56) References Cited

U.S. PATENT DOCUMENTS

| | | |
|---|---|---|
| 2005/0236240 A1 | 10/2005 | Pacchiana et al. |
| 2010/0018815 A1* | 1/2010 | Murdie ............... C04B 35/6264 |
| | | 188/218 XL |
| 2015/0166410 A1 | 6/2015 | Waghray et al. |
| 2017/0002458 A1* | 1/2017 | Le Costaouec ....... F16D 69/028 |
| 2021/0039998 A1 | 2/2021 | Sheedy et al. |

* cited by examiner

METHODS OF FORMING SiAlON IN CARBON/CARBON COMPOSITES

FIELD

The present disclosure relates generally to aircraft wheel and brake assemblies and, more particularly, to carbon/carbon (C/C) composites and methods of fabricating C/C composites for use in aircraft wheel and brake assemblies.

BACKGROUND

Aircraft typically utilize brake systems on wheels to slow or stop the aircraft during landings, taxiing and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

C/C composites have found use in aerospace and other industries for fabricating brake stacks and heat sinks. C/C composites exhibit various degrees of wear resistance based on their construction, materials, and the heat treatments performed during fabrication of C/C composite. Incorporating ceramic particles in C/C composites has been shown to improve wear resistance (e.g., decrease wear). Many ceramics have a higher thermal expansion as compared carbon/carbon. The difference in the thermal expansion of the ceramic particles as compared to the carbon/carbon can cause the ceramic particles to dislodge from the carbon matrix during thermal cycling of the brake.

SUMMARY

A method of making a C/C composite is disclosed herein. In accordance with various embodiments, the method may comprise the steps of forming a Silicon-Aluminum-Oxygen-Nitrogen (SiAlON) precursor suspension, infiltrating a fibrous preform with the SiAlON precursor suspension, performing a SiAlON forming heating treatment on the fibrous preform to form SiAlON particles, and densifying the fibrous preform by chemical vapor infiltration (CVI) to form a densified fibrous preform.

In various embodiments, forming the SiAlON precursor suspension may comprise combining an aluminum source, a silicon source, and a carrier fluid.

In various embodiments, the aluminum source may comprise alumina. In various embodiments, the silicon source may comprise silica.

In various embodiments, the SiAlON precursor suspension may further comprise carbon black.

In various embodiments, the silicon source may comprise colloidal silica and the aluminum source may comprise colloidal alumina.

In various embodiments, the silicon source may comprise a polysilazane polymer and the aluminum source may comprise alumina ($Al_2O_3$) particles.

In various embodiments, performing the SiAlON forming heating treatment on the fibrous preform may comprise heating the fibrous preform in a presence of nitrogen gas and at a temperature of between 1100° C. and 1600° C.

A C/C composite is also disclosed herein. In accordance with various embodiments, the C/C composite may comprise a plurality of carbon fibers, a carbon matrix surrounding the carbon fibers, and a plurality of SiAlON particles dispersed in the carbon matrix.

In various embodiments, the SiAlON particles may form between 0.5% and 5.0% of a weight percentage of the C/C composite.

In various embodiments, the SiAlON particles may have an average particle size of between 10 nanometers and 500 nanometers.

In various embodiments, at least a portion of the SiAlON particles are Beta SiAlON particles represented by formula $Si_{6-z}Al_zO_zN_{8-z}$ where z is greater than 0 and less than or equal to 5.

In accordance with various embodiments, a method of making a C/C composite may comprise the steps of partially densifying a fibrous preform, infiltrating the fibrous preform with a first SiAlON precursor suspension, performing a first SiAlON forming heating treatment on the fibrous preform, and densifying the fibrous preform to form a fully densified fibrous preform.

In various embodiments, the method may further comprise the steps of performing a first heat treatment on the fibrous preform prior to partially densifying the fibrous preform and performing a second treatment on the fully densified fibrous preform.

In various embodiments, the method may further comprise the step of infiltrating the fibrous preform with a second SiAlON precursor suspension prior to partially densifying the fibrous preform. In various embodiments, the method may further comprise the step of performing a second SiAlON forming heating treatment on the fibrous preform after infiltrating the fibrous preform with the second SiAlON precursor suspension and prior to partially densifying the fibrous preform.

In various embodiments, the method may further comprise the step of forming the first SiAlON precursor suspension by combining an aluminum source, a silicon source, and a carbon source. In various embodiments, the silicon source may be positively charged. In various embodiments, the silicon source may comprise colloidal silica, the aluminum source may comprise colloidal alumina, and the carbon source may comprise carbon black.

In various embodiments, the method may further comprise the step of forming the first SiAlON precursor suspension by combining a polysilazane polymer and an aluminum source.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims. The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of elucidation and not of limitation. Furthermore, any reference to the singular includes plural embodiments, and any reference to more than one component or Step may include a singular embodiment or Step. Likewise, references to "a," "an" or "the" may include one item or more than one item and such reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. All ranges may include upper and lower values and all ranges and ratio limits disclosed herein may be combined. Further, the term "about" is intended to include a degree of error associated with measurement of a particular quantity based upon equipment or techniques otherwise available at the time of filing the application.

Disclosed herein is a C/C composite having ultra-fine Silicon-Aluminum-Oxygen-Nitrogen (SiAlON) particles distributed therein and methods for making the same. Incorporating SiAlON particles in C/C composites tends to improve the wear resistance of the C/C composite. SiAlON particles have a thermal expansion closer to that of carbon/carbon. In accordance with various embodiments, the SiAlON particles are formed by introducing sources of Si, Al, O and N during one or more stages of the carbon/carbon fabrication and performing one or more heat treatments to form the ultra-fine (e.g., nanosized) SiAlON particles.

Figure 1:
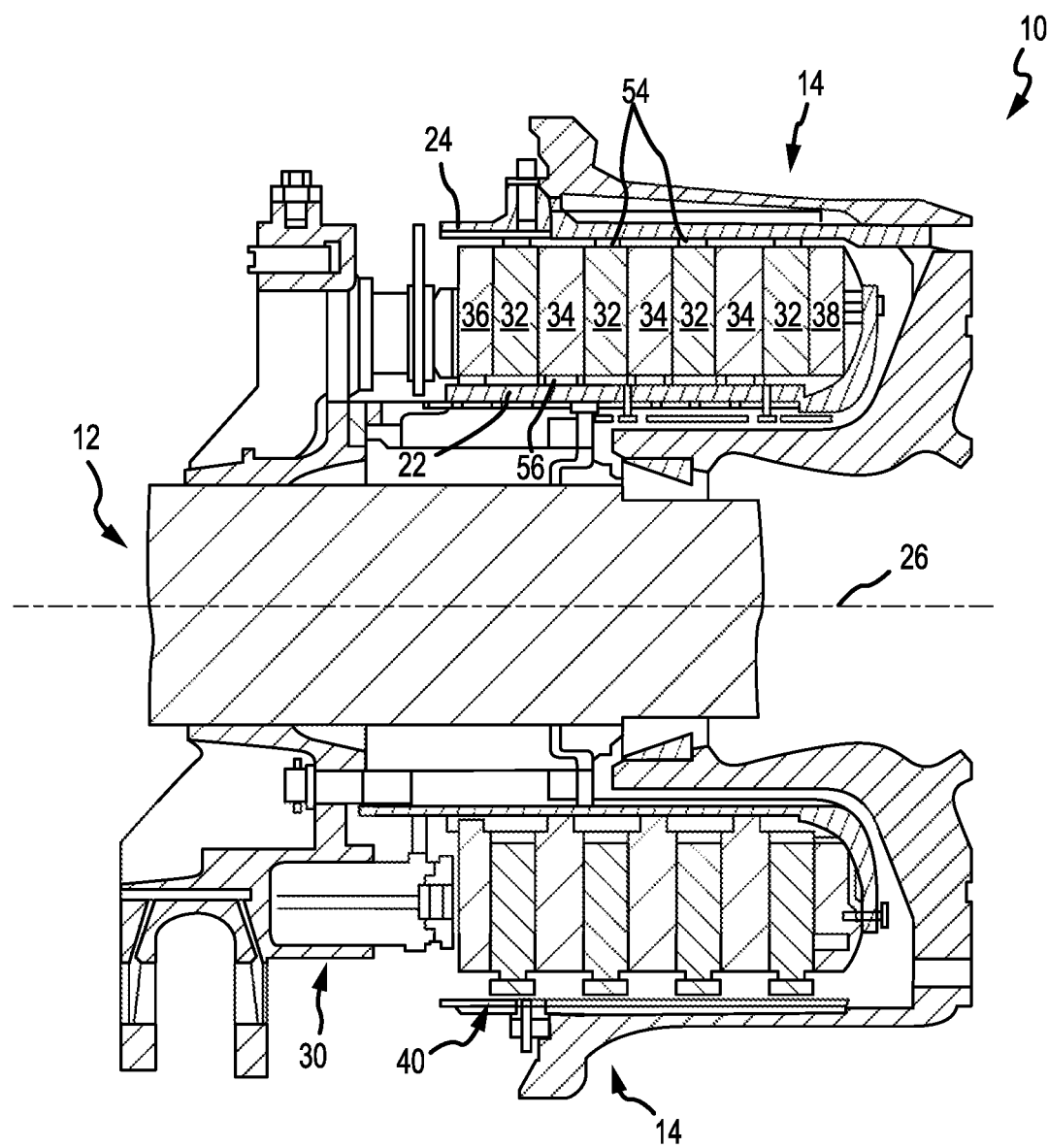
FIG. 1 illustrates a cross sectional view of an aircraft wheel braking assembly, in accordance with various embodiments.

With reference to FIG. 1, a wheel braking assembly 10 such as may be found on an aircraft is illustrated, in accordance with various embodiments. Aircraft wheel braking assembly 10 may comprise a bogie axle 12, a wheel 14, a torque tube 22, one or more torque bars 24, a wheel rotational axis 26, an actuator 30, brake rotors 32, brake stators 34, a pressure plate 36, an end plate 38, a heat shield 40, multiple rotor lugs 54, and multiple stator slots 56.

Rotors 32 are interleaved with stators 34. Rotors 32 are secured to torque bars 24 for rotation with wheel 14, while stators 34 are engaged with torque tube 22. At least one actuator 30 is operable to compress interleaved rotors 32 and stators 34 for stopping the aircraft. Pressure plate 36 and end plate 38 are disposed at opposite axial ends of the interleaved rotors 32 and stators 34. Through compression of interleaved rotors 32 and stators 34 between pressure plates 36 and end plate 38, the resulting frictional contact slows rotation of wheel 14.

In accordance with various embodiments, one or more of the friction disks (e.g., one or more of rotors 32, stators 34, pressure plate 36, and end plate 38) may be formed of a C/C composite having SiAlON particles distributed therein. The C/C composites may operate as heat sinks to absorb large amounts of kinetic energy converted to heat during slowing of the aircraft. While the disclosed methods and C/C composites may find particular use in connection with aircraft brake disks, various aspects of the disclosed embodiments may be adapted for manufacturing a variety of C/C composite components. For example, the disclosed methods and C/C composites may be used to form other C/C aircraft components that would benefit from improved wear and/or C/C components in other industries. As such, numerous applications of the present disclosure may be realized.

Figure 2:
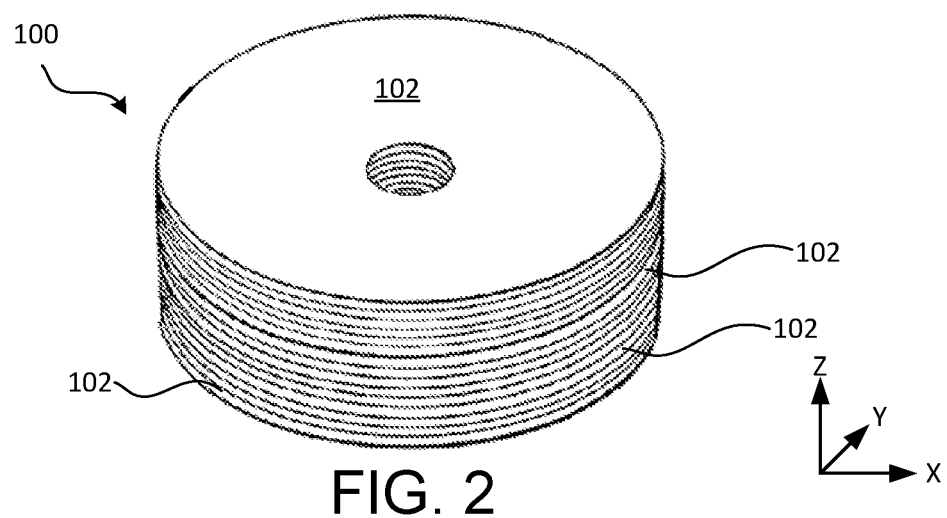
FIG. 2 illustrates a fibrous preform, in accordance with various embodiments.

Referring now to FIG. 2, a fibrous preform 100, which may be used to fabricate one or more of the friction disks of FIG. 1 is illustrated, in accordance with various embodiments. Fibrous preform 100 may comprise a porous structure comprised of a plurality of stacked textile layers 102. As used herein, a porous structure includes any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be preoxidized PAN or fully carbonized commercial carbon fiber. Fibrous preform 100 may be prepared by needling the textile layers 102 of fibrous preform 100. Needling the textile layers 102 tends to push fibers from one layer 102 into the next layer 102, thereby forming z-fibers that extend perpendicularly across the layers 102. After needling, fibrous preform 100 may comprise fibers extending in three different directions (i.e., in the x and y directions and the z direction).

Figure 3:
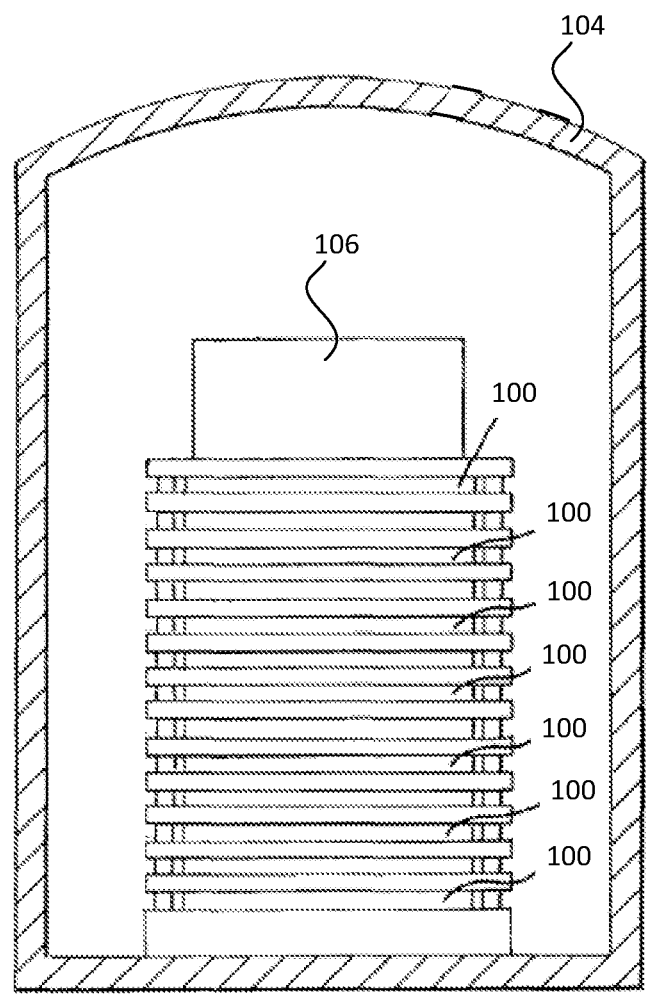
FIG. 3 illustrates fibrous preforms in a carbonization furnace, in accordance with various embodiments.

As shown in FIG. 3, fibrous preforms 100 may be placed in a furnace 104 for carbonization. The carbonization process may be employed to convert the fibers of the fibrous preforms 100 into pure carbon fibers, as used herein only "pure carbon fibers" means carbon fibers comprised of at least 99% carbon. The carbonization process is distinguished from the densification process, described below, in that the densification process involves infiltrating the pores of the fibrous preform 100 and depositing a carbon matrix within and around the carbon fibers of the fibrous preform 100, and the carbonization process refers to the process of converting the fibers of the fibrous preform 100 into pure carbon fibers.

Figure 4:
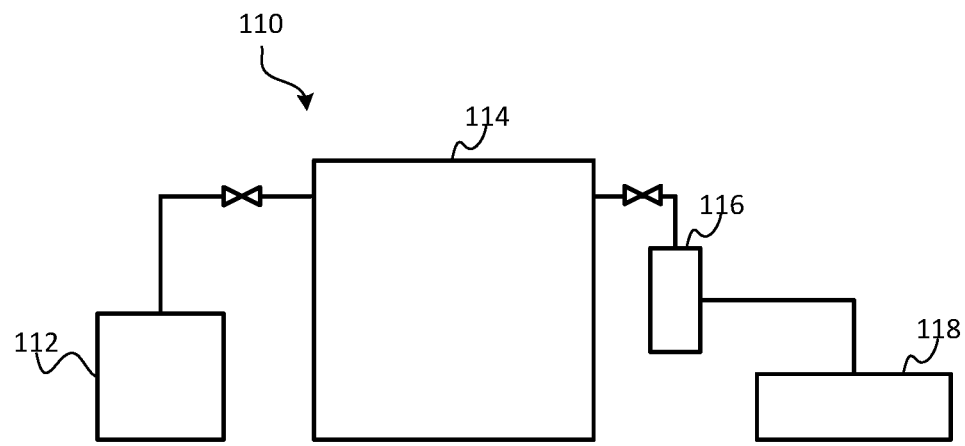
FIG. 4 illustrates an exemplary preform infiltration system, in accordance with various embodiments.

As described in further detail below, the fibrous preform 100 may be infiltrated with a SiAlON precursor preparation. As used herein, a SiAlON precursor preparation describes a suspension and/or composition including various SiAlON forming particles (e.g., $Al_2O_3$, $SiO_2$, carbon black, polysilazane). The SiAlON precursor preparation may be a colloidal suspension, a slurry, a sol gel, or any other preparation suitable for infiltration into a carbon structure (e.g., fibrous preform 100). With reference to FIG. 4, an exemplary preform infiltration system 110 is shown, in accordance with various embodiments. System 110 may include a fluid reservoir 112 for storing and delivering the SiAlON precursor suspension into the vacuum chamber 114. Vacuum chamber 114 is equipped with a tank in which the fibrous preforms 100 (FIG. 2) may be located. Vacuum pump 118 and trap 116 are used to first evacuate the porosity of the fibrous preforms 100 and subsequently facilitate drawing the SiAlON precursor suspension into the tank containing the parts to be infiltrated (e.g., the fibrous preforms 100). In various embodiments, following infiltration, the fibrous preforms 100 are removed and dried in a separate oven.

After infiltrating the fibrous preform 100 with the SiAlON precursors, the infiltrated fibrous preform 100 may undergo a series of heat treatment(s) and densification cycles. In accordance with various embodiments, the incorporation of a controlled starting amount of very fine SiAlON precursors throughout the fibrous preform or throughout a partially densified fibrous preform may lead to the formation of very fine SiAlON particles during the subsequent heat treatments and carbon densification cycles. Additives such as a wetting agent may be included in the SiAlON precursor suspension to facilitate wetting of the preform or of the partially densified fibrous preform. During subsequent heat treatments of the fibrous preform, which, in various embodiments, may be performed in the presence of nitrogen gas, the SiAlON precursors are transformed into SiAlON particles. In various embodiments, the SiAlON particles may comprise an average particle size of less than 500 nm, less than 250 nm, less than 100 nm and or less than 50 nm (e.g., an average particle size of between 10 nm and 500, between 10 nm and 250 nm, between 10 nm and 100, or between 10 and 50 nm).

Figure 6A:
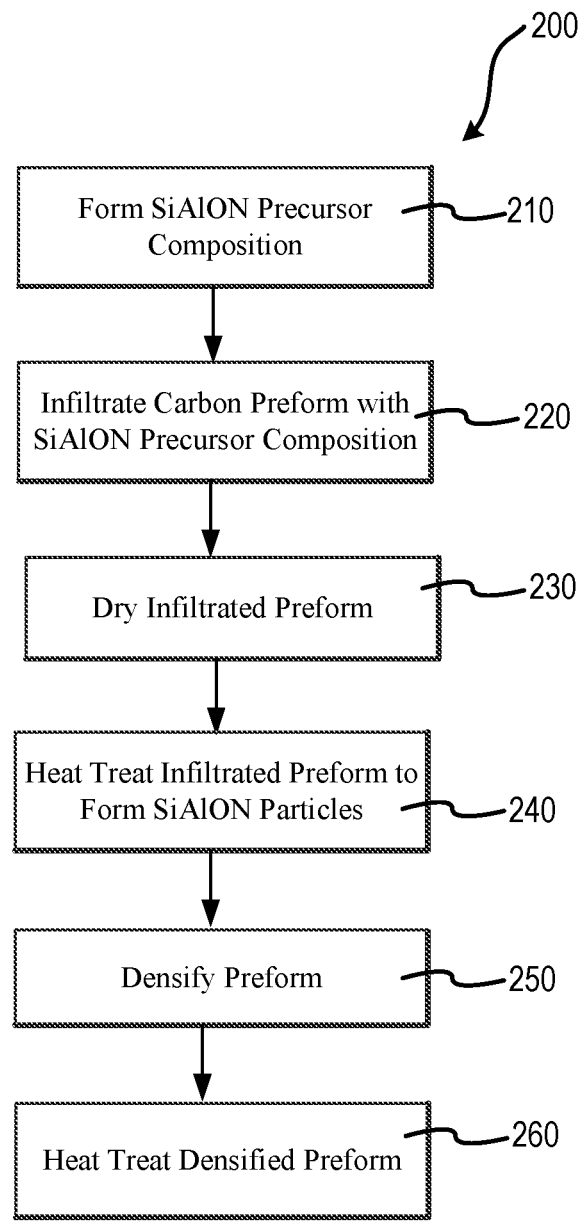
FIGS. 6A and 6B illustrates a method of forming a C/C composite having SiAlON particles, in accordance with various embodiments.

With reference to FIG. 6A, a method 200 for making a C/C composite having SiAlON particles is shown, in accordance with various embodiments. Method 200 may be employed to form one or more of the friction disks of FIG. 1. In accordance with various embodiments, method 200 includes forming a SiAlON precursor suspension (Step 210). The SiAlON precursor suspension may be formed by combining a silicon source and an aluminum source with a carrier fluid such as, for example, water. In various embodiments, the SiAlON precursor suspension comprises stable nanosized aluminum oxide, or "alumina," ($Al_2O_3$) particles and stable nanosized silicon dioxide, or "silica," ($SiO_2$) particles. The SiAlON precursor suspension may be prepared from dry (e.g., powder) nano-sized alumina and silica particles or already suspended nano-sized alumina and silica particles. Alumina particles typically have a positive charge and silica particles typically have a negative charge. In accordance with various embodiments, to create a stable composition of silica and alumina particles, the SiAlON precursor suspension may be formed with silica particles that are positively charged. For example, in various embodiments, the silicon source may comprise silica particles having a thin film of positively charged aluminum oxide. Employing positively charged silica particles tends to stabilize each of the silica source and the alumina source in the SiAlON precursor suspension.

In various embodiments, the silicon source may comprise colloidal silica. In various embodiments, the colloidal silica may be a 30% by weight suspension of silica in water. The colloidal silica may have a pH of 5.0 or less (e.g., a pH between 3.0 and 5.0) and a formula weight of 60.08 g/mol. The average particle size of the silica in the colloidal silica may be between 5 nanometers (nm) and 50 nm, between 10 nm and 20 nm, or about 12 nm. As used in the previous context only, the term about means±10% of the associated value. In various embodiments, the surface of the silica in the colloidal silica is modified with aluminum oxide in order to induce a positive charge. A suitable colloidal silica for use in the SiAlON precursor suspension is available under the trade name LUDOX® CL, from W. R. Grace and Co., Columbia, Maryland, USA. In various embodiments, the silica source may comprise fumed silica.

In various embodiments, the aluminum source may comprise colloidal alumina. In various embodiments, $Al_2O_3$ may form between 19% and 21% of the weight percentage of the colloidal alumina. In various embodiments, the colloidal alumina may be a colloidal dispersion of boehmite, having an average particle size of between 40 nm and 150 nm, between 50 nm and 100 nm, or between 60 nm and 90 nm, and 20% by weight $Al_2O_3$. In various embodiments, a pH of the colloidal alumina is less than 5.0 (e.g., between 3.0 and 5.0). In various embodiments, a pH of the colloidal alumina is between 3.6 and 4.3. A suitable colloidal alumina for use in the SiAlON precursor suspension is available under the trade name NYACOL® AL27, from Nyacol Nano Technologies, Inc., Ashland, Massachusetts, USA. In various embodiments, the aluminum source may comprise fumed alumina.

In accordance with various embodiments, the silicon and aluminum oxides may be transformed into SiAlON particles through a carbo-thermal reduction reaction in a nitrogen environment, as described in Step 240 below. In various embodiments, it may be advantageous to provide an additional source of carbon in the SiAlON precursor suspension to facilitate the reduction of the silicon and aluminum oxides. This may be accomplished by adding a carbon source to the SiAlON precursor suspension. In various embodiments, the carbon source may be an aqueous carbon black dispersion. In various embodiments, the carbon source may include one or more water soluble polymers such as a polyvinyl alcohol (PVA), polyvinylpyrrolidone (PVP), polyvinyl acetate, poly (2-oxazoline), polyacrylamide (PAM), polyethyleneimine (PEI), and/or polyacrylate (PAA). An aqueous emulsion of polyester, epoxy, or phenolic may be also used for the carbon source.

Figure 5:
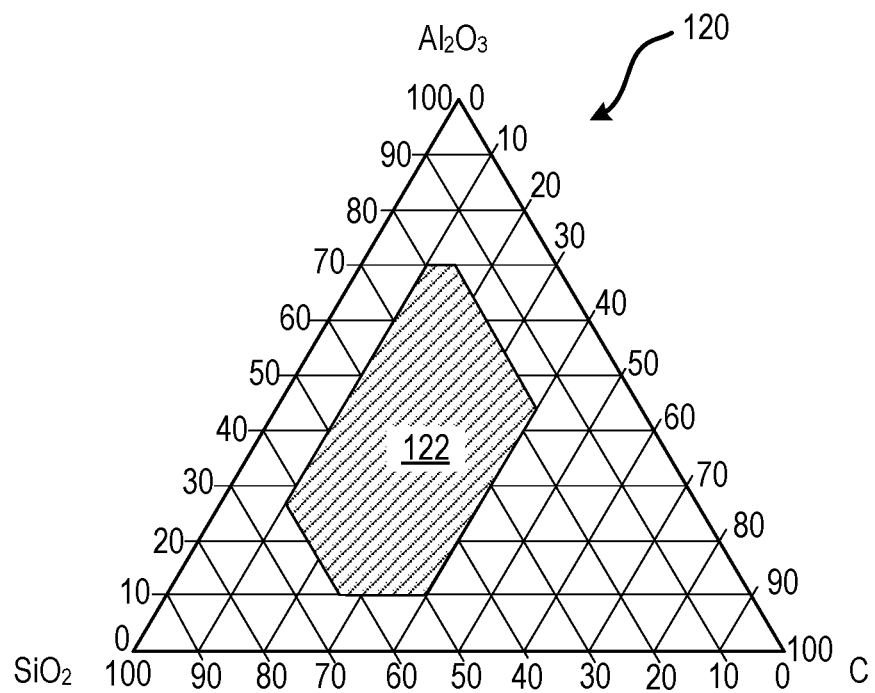
FIG. 5 illustrates a graph showing the compositional ratios for a SiAlON precursor suspension, in accordance with various embodiments.

With brief reference to FIG. 5, a graph 120 illustrating compositional ratios of silica, alumina and carbon in the SiAlON precursor suspension. In accordance with various embodiments, region 122 illustrates the compositional ratios of silica, alumina and carbon in the SiAlON precursor suspension. For example, in various embodiments, silica may comprise between 15% and 65%, by weight, of the SiAlON precursor suspension, alumina may comprise between 10% and 70%, by weight, of the SiAlON precursor suspension, and carbon may comprise between 10% and 40%, by weight, of the SiAlON precursor suspension. In accordance with various embodiments, the silica and alumina particles may be transformed into SiAlON particles through pyrolysis in a nitrogen environment.

Returning to FIG. 6A, in various embodiments, the silicon source in the SiAlON precursor suspension may comprise a preceramic polysilazane polymer. In various embodiments, the polysilazane polymer may be polyureavinylmethylsilazane; however, any suitable silazane may be employed. In various embodiments, the polysilazane polymer may provide the source of the silicon and the nitrogen in the SiAlON particles. A suitable polysilazane polymer for use in the SiAlON precursor suspension is available under the trade name DURAZANE® 1800, from EMID Performance Materials, which is a business of Merck KGaA, Darmstadt, Germany.

The concentration of the silicon and nitrogen (e.g., the polysilazane polymer) and viscosity of the SiAlON precursor suspension may be adjusted with the addition of a nonpolar solvent (e.g., hexane, di-n-butyl ether, toluene). The polysilazane polymer may be combined with the aluminum source. For example, polysilazane polymer and nano-sized alumina particles (e.g., alumina powder) may be mixed to form the SiAlON precursor suspension. In various embodiments, the alumina particles may have average particle size of between 1 nm and 250 nm, between 5 nm and 50 nm, between 10 nm and 15 nm, or about 13 nm. The alumina particles may have an average surface area of between 50 $m^2g^{-1}$ and 500 $m^2g^{-1}$, between 75 $m^2g^{-1}$ and 250 $m^2g^{-1}$, between 75 $m^2g^{-1}$ and 150 $m^2g^{-1}$, or about 100 $m^2g^{-1}$. As used in the previous context only, the term about means+10% of the associated value. Suitable alumina particles for use in the SiAlON precursor suspension are available under the trade name AEROXIDE® Alu C, from Evonik Industries, Essen, Germany. In various embodiments, the alumina particles may have average particle size of between 20 nm and 300 nm, between 150 nm and 250 nm, or about 200 nm. The alumina particles may have an average surface area of 11.1 $m^2g^{-1}$. Suitable alumina particles for use in the SiAlON precursor suspension are available under the trade name AKP-50, from Sumitomo Chemical Company, Tokyo, Japan. In various embodiments, the polysilazane polymer and alumina particle mixture may be sonicated to break down the oxide agglomerates. In accordance with various embodiments, the polysilazane polymer and alumina particles may be transformed into SiAlON particles through pyrolysis in a nitrogen environment, as described in Step 240 below.

In various embodiments, a mole ratio of $Si_3N_4$ to $Al_2O_3$ in the SiAlON precursor suspension may be between 0.5 to 1.0 and 3.0 to 1.0, between 0.7 to 1.0 and 2.5 to 1.0, between 0.7 to 1.0 and 2.33 to 1.0, and/or between 1.5 to 1.0 and 2.33 to 1.0. The weight ratio of $Si_3N_4$ to $Al_2O_3$ in the SiAlON precursor suspension may be between 0.5 to 1.0 and 4.0 to 1.0, between 0.9 to 1.0 and 3.2 to 1.0, between 0.9 to 1.0 and 1.5 to 1.0, and/or between 2.5 to 1.0 and 3.2 to 1.0.

In accordance with various embodiments, method 200 further comprises infiltrating the fibrous preform with the SiAlON precursor suspension (Step 220). In various embodiments, infiltration may be conducted by immersing the fibrous preform in the aqueous SiAlON precursor suspension. In various embodiments, infiltration may be conducted following evacuation of the pores of the fibrous preform using a vacuum chamber. For example, the fibrous preform may be infiltrated with the SiAlON precursor suspension using system 110 in FIG. 4.

In various embodiments, following infiltration, the part may be dried to remove water and/or any other carrier fluid (Step 230). The SiAlON precursors may increase a weight of the dry preform by between 0.5% and 15%. In this regard, after drying, the weight of the infiltrated fibrous preform may be between 0.5% and 15% greater than the weight of the fibrous preform prior to infiltration (i.e., prior to Step 220). In various embodiments, the particle concentration of the SiAlON precursor suspension may be selected to increase the weight of the fibrous preform by between 2.0% and 10%, between 2.5% and 3.0%, between 6% and 9%, by about 7.0% and/or by about 8.0%. As used in the previous context only, the term about means+0.5%. The target weight percentage increase may provide a volume of SiAlON particles that improve the wear of the final C/C composite component without negatively impacting the mechanical properties of the C/C composite component. In various embodiments, the SiAlON particles may form between about 0.5% and about 10.0%, between about 0.5% and about 5%, and/or between about 3.0% and about 5.0% of the total weight of the final C/C composite. As used in the previous context only, the term "about" means+0.5%

In various embodiments, the infiltrated fibrous preform may undergo a heat treatment (Step 240). Step 240 may include heat treating the infiltrated fibrous preform to a suitable temperature to transform the SiAlON precursors into SiAlON particles. In various embodiments, the heat treatment (also referred to herein as a "SiAlON forming heat treatment") is performed in the presence of nitrogen gas. In various embodiments, the nitrogen gas may be a source of the nitrogen in the SiAlON particles. Step 240 may be conducted in a separate furnace or during the ramp up to the temperature of the carbon densification cycle(s) (as described below in Step 250). In various embodiments, the SiAlON forming heat treatment may comprise heat treating the infiltrated fibrous preform in the presence of nitrogen gas and at a temperature of between 1000° C. and 2000° C. (between 1832° F. and 3632° F.) for between 1.0 hour and 20.0 hours. In various embodiments, the SiAlON forming heat treatment may comprise heat treating the infiltrated fibrous preform in the presence of nitrogen gas and at a temperature of between 1100° C. and 1600° C. (between 2012° F. and 2912° F.) for between 4 and 20 hours. In various embodiments, the SiAlON forming heat treatment may comprise heat treating the infiltrated fibrous preform in the presence of nitrogen gas and at a temperature of between 1400° C. and 1600° C. (between 2552° F. and 2912° F.) for between 4 and 20 hours. In various embodiments, the SiAlON forming heat treatment may comprise heat treating the infiltrated fibrous preform in the presence of nitrogen gas and at a temperature of about 1500° C. (2732° F.) for between 4 and 20 hours. As used in the previous context only, the term "about" means±250° C. In accordance with various embodiments, heating the infiltrated preform in the presence of nitrogen gas may initiate the transformation of the SiAlON precursors into SiAlON particles. In this regard, at least a portion of the SiAlON particles may be formed during the heat treatment (e.g., during Step 240).

The SiAlON particles may include alfa, beta, and O form SiAlON. In accordance with various embodiments, any form of SiAlON or mixtures of SiAlON (e.g., mixtures of alfa and beta SiAlON) may be formed. Beta SiAlON is described as $Si_{6-z}Al_zO_zN_{8-z}$ where z is greater than 0 and less than or equal to 5. In various embodiments, z may equal 3 (e.g., $Si_3Al_3O_3N_5$). In accordance with various embodiments, the atomic ratio of Si to Al in the SiAlON particles may be approximately 1.0 to 1.0 and may correspond to a ratio, by weight, of $SiO_2$ to $Al_2O_3$ in the SiAlON precursor suspension of between 1.0 to 1.0 and 2.0 to 1.0, between 1.1 to 1.0 and 1.5 to 1.0, between 1.15 to 1.0 and 1.25 to 1.0, between 1.18 to 1.0 and 1.20 to 1.0, or about 1.19 to 1.0. As used in the previous context only, the term "approximately" means±0.5. In various embodiments, carbon may form between about 20% and about 33%, by weight, of the SiAlON precursor composition. As used in the previous context only, the term "about" mean 5.0%.

In various embodiments, after heat treating the infiltrated fibrous preform (e.g., after Step 240) one or more densification cycles may be performed (Step 250). Step 250 results in a C/C composite (also referred to herein as a densified fibrous preform). In various embodiments, the densification is done using chemical vapor infiltration (CVI). During densification, the carbon matrix is formed by depositing carbon on and around the carbon fibers. In various embodiments, densification may comprise a single CVI cycle. In various embodiments, densification may include multiple CVI cycles. Each CVI cycle may be followed by a heat treatment with a final heat treatment (Step 260) following the final CVI cycle. Stated differently, after densification, the densified fibrous preform may undergo a final heat treatment (Step 260). The final heat treatment may comprise heat treating the densified fibrous preform at a temperature of 1600° C. (2912° F.) or greater for between 1.0 hour and 20.0 hours. In various embodiments, the final heat treatment may comprise heat treating the densified fibrous preform at a temperature of between 1850° C. and 2200° C. (between 3362° F. and 3992° F.) for between 4.0 and 20.0 hours. In various embodiments, the SiAlON particles may form between about 0.5% and about 10.0%, between about 0.5% and about 5%, and/or between about 3.0% and about 5.0% of the total weight of the final C/C composite. As used in the previous context only, the term "about" means±0.5%

Figure 6B:
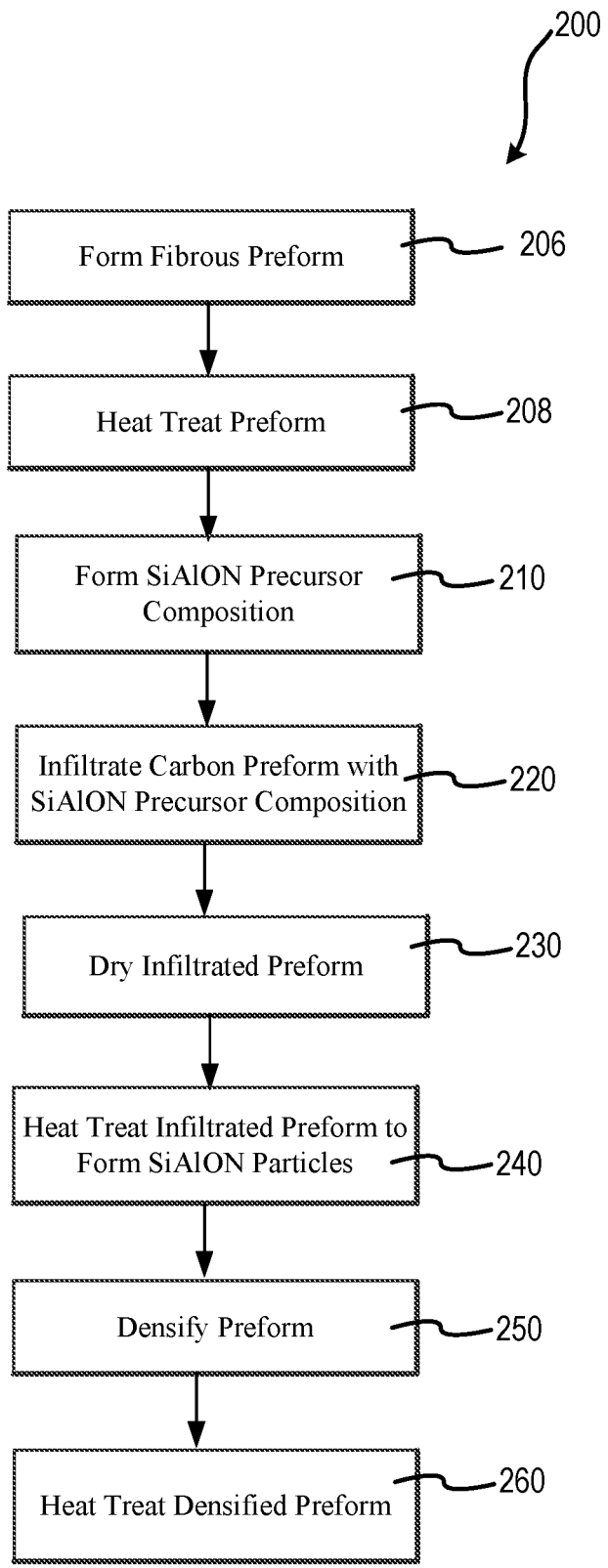

With reference to FIG. 6B, in various embodiments, method 200 may further include forming the fibrous preform (Step 206). Step 206 may include carbonizing the fibrous preform such that the carbon fibers of the preform are at least 99% carbon. In various embodiments, a weight 106 (FIG. 3) may apply pressure to the fibrous preforms during carbonization. The application of pressure may increase the fiber volume of the carbonized fibrous preforms.

In various embodiments, the fibrous preform may be heat treated (Step 208) prior to being infiltration with the SiAlON precursor suspension (i.e., prior to Step 220). Stated differently, after carbonization and prior to infiltration, the fibrous preform may undergo a first heat treatment. The first heat treatment may comprise heat treating the fibrous preform at a temperature of between 1600° and 2600° C. (between 2912° F. and 4712° F.) for between 1.0 hour and 20.0 hours. In various embodiments, the first heat treatment may comprise heat treating the fibrous preform at a first temperature of between 1800° C. and 2400° C. (between 3272° F. and 4352° F.) for between 4.0 and 20.0 hours.

Figure 7A:
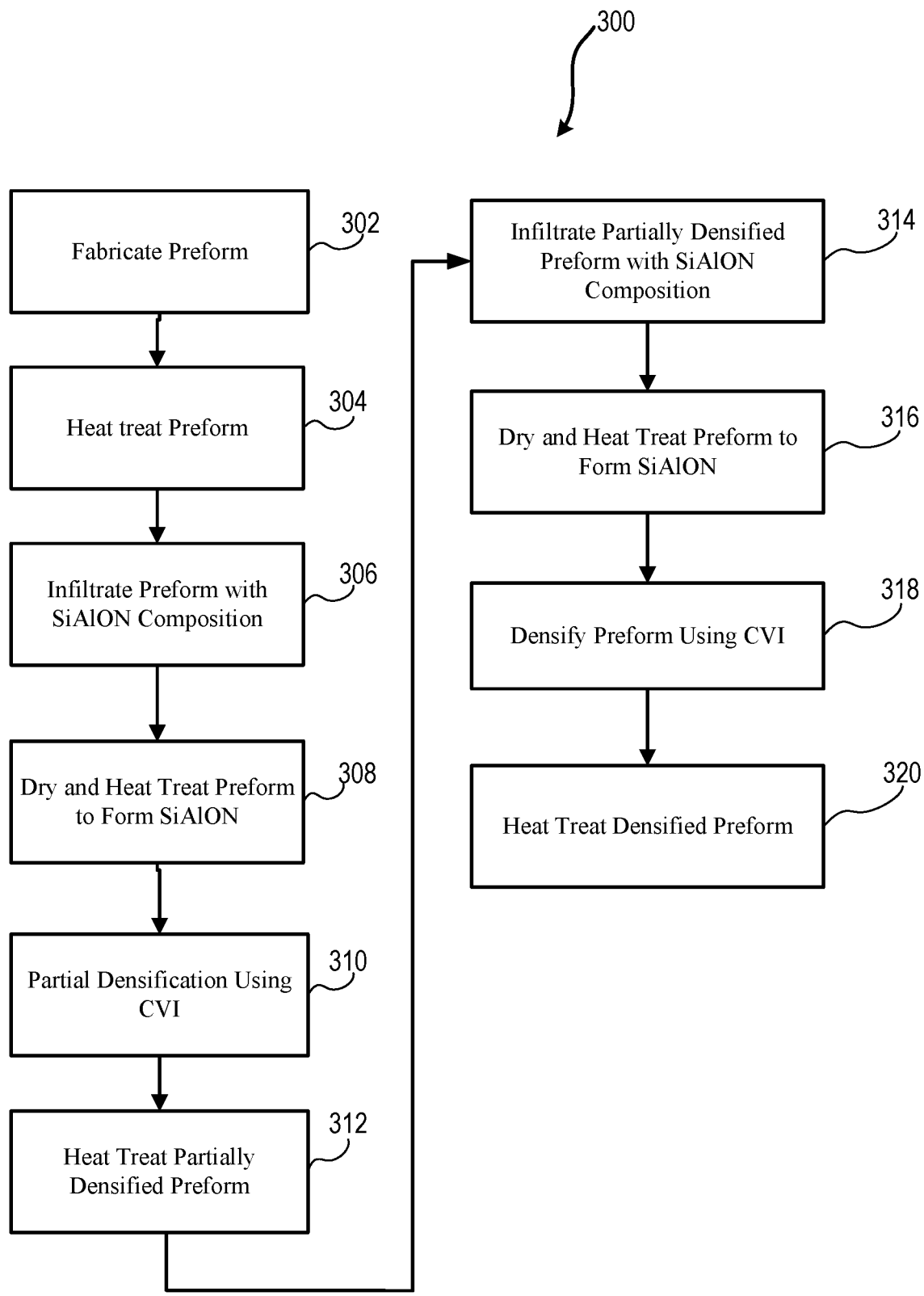
FIG. 7A illustrates a method of forming a C/C composite having SiAlON particles by applying a SiAlON precursor suspension at multiple times, in accordance with various embodiments.

With reference to FIG. 7A, in various embodiments, a method 300 for making a C/C composite having SiAlON particles is shown, in accordance with various embodiments. Method 300 may be employed to form one or more of the friction disks of FIG. 1. In accordance with various embodiments, method 300 may include forming a fibrous preform (Step 302) and heat treating the fibrous preform (Step 304). Step 302 may be similar to Step 206, described above with reference to method 200. The (first) heat treatment of Step 304 may similar to heat treatment described above with reference to Step 208 described above with reference to method 200.

In various embodiments, method 300 further includes infiltrating the fibrous preform with a SiAlON precursor suspension (Step 306). Step 306 may be similar to Step 220, described above with reference to method 200. In accordance with various embodiments, the SiAlON precursor suspension may include a mixture of colloidal silica, colloidal alumina and carbon black. In various embodiments, the SiAlON precursor suspension may include a mixture of a preceramic polysilazane polymer and alumina particles. In various embodiments, the SiAlON precursor suspension may be formed as described above with reference to Step 210 of method 200.

After infiltration, the infiltrated fibrous preform is dried and heat treated to (Step 308). Step 308 may be similar to drying Step 230 and SiAlON forming heat treatment Step 240, described above with reference to method 200. SiAlON particles may be, at least, partially formed during Step 308. The fibrous preform, which now includes SiAlON particles may then be partially densified using CVI. (Step 310). The partial densification may cause a portion of the porosity of the fibrous preform to be filled/densified with the carbon matrix. After the partial densification, the partially densified fibrous preform may be heat treated (Step 312). Step 312 may include heat treating the partially densified fibrous preform at a temperature of between 1600° C. and 2500° C. (between 2912° F. and 4532° F.) or between 1800° C. and 2200° C. (between 3272° F. and 3992° F.) for between 1.0 and 20.0 hours.

The partially densified fibrous preform may then be infiltrated with a SiAlON precursor suspension (Step 314). Step 314 may be similar to Step 220, described above with reference to method 200. In accordance with various embodiments, the SiAlON precursor suspension may include a mixture of colloidal silica, colloidal alumina and carbon black. In various embodiments, the SiAlON precursor suspension may include a mixture of a preceramic polysilazane polymer and alumina particles. In various embodiments, the SiAlON precursor suspension may be formed as described above with reference to Step 210 of method 200. In various embodiments, the composition of the SiAlON precursor suspension employed in Step 306 may be the same as the composition of SiAlON precursor suspension employed in Step 314. In various embodiments, a weight ratio of the components in SiAlON precursor suspension employed in Step 306 may be different from a weight ratio of the components in SiAlON precursor suspension employed in Step 314.

After the second infiltration, the infiltrated fibrous preform is dried and heat treated (Step 316). Step 316 may be similar to drying Step 230 and SiAlON forming heat treatment Step 240, described above with reference to method 200. SiAlON particles may be, at least, partially formed during Step 316. The fibrous preform, which now includes SiAlON particles may then be further densified using CVI (Step 318) and may undergo a final heat treatment (Step 320). Steps 318 and 320 may be similar, respectively, to Steps 250 and 260, described above with reference to method 200.

Figure 7B:
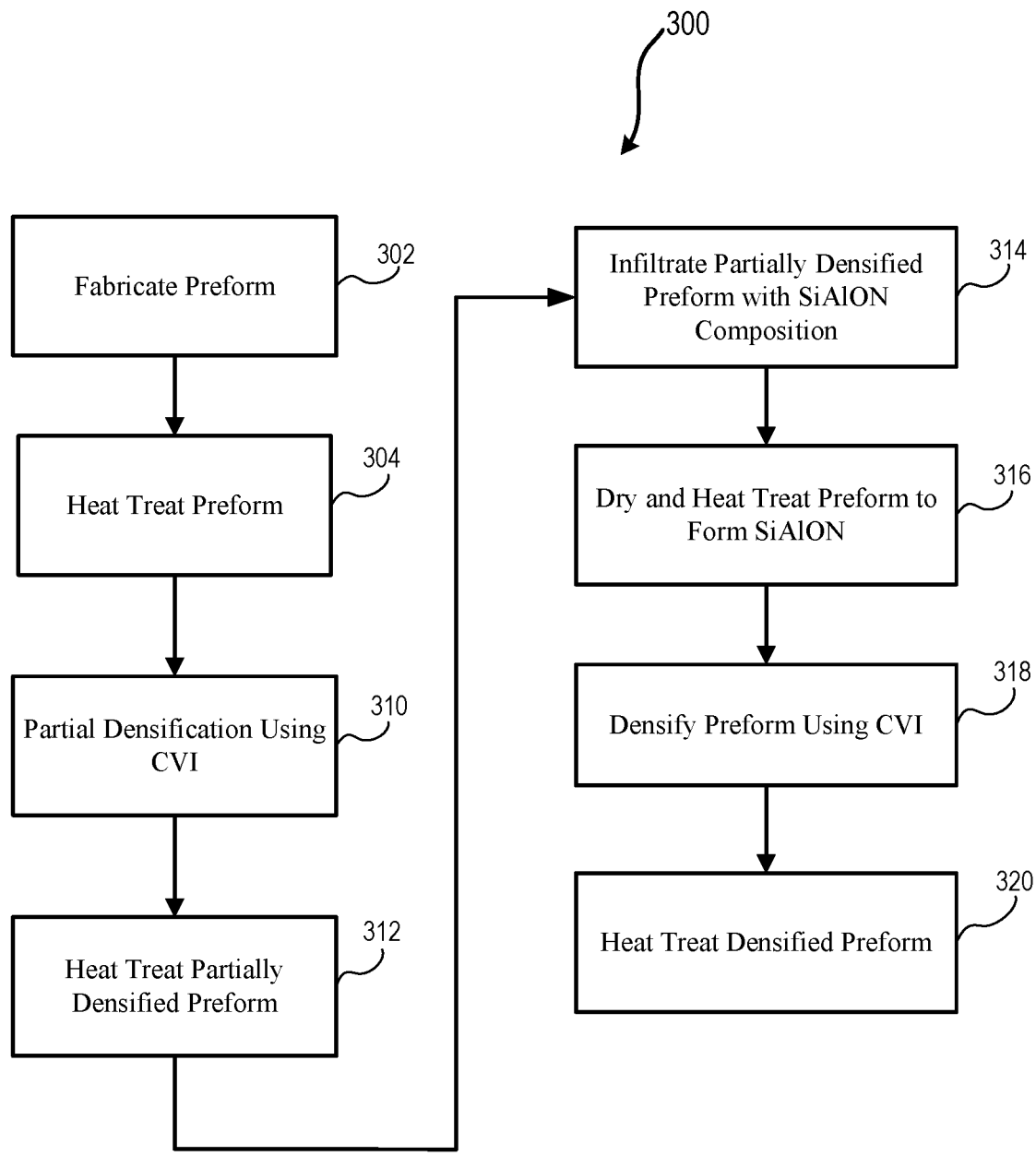
FIG. 7B illustrates a method of forming a C/C composite having SiAlON particles by applying a SiAlON precursor suspension following a partial densification, in accordance with various embodiments.

With reference to FIG. 7B, in various embodiments, method 300 may include a single infiltration operation (e.g., Step 314). The infiltration may be performed on the partially densified fibrous preform. In this regard, in various embodiments, infiltration with the SiAlON precursor suspension prior to partial densification may be eliminated from method 300. Stated differently, and with combined reference to FIGS. 6A, 7A and 7B, in various embodiments, the fibrous preform may be infiltrated at a single stage of the C/C composite fabrication, for example, at the preform level, as shown in Step 220 of FIG. 6A and Step 306 in FIG. 7A, or after a partial pyrolytic carbon densification, as shown in Step 314 of FIGS. 7A and 7B. In various embodiments, the fibrous preform may be infiltrated during multiple stages of the C/C composite fabrication, as illustrated in Steps 306 and 314 of FIG. 7A. For example, a SiAlON precursor suspension, as described herein, may be introduced into the fibrous preform before and after one or more partial CVI pyrolytic densifications (e.g., a SiAlON precursor suspension infiltration may be performed both before and after Step 310 in FIG. 7A).

Implementing the various Steps, techniques, combinations, etc. discussed herein, below are various examples for forming C/C composites having SiAlON particles distributed therein.

Example 1

A SiAlON precursor suspension of $Al_2O_3$, $SiO_2$ and carbon black was prepared with the following composition: 30.3%, by weight, $Al_2O_3$ in the form of NYACOL® AL 27, 36.0%, by weight, $SiO_2$ in the form of LUDOX® CL, and 33.7%, by weight, carbon black. The concentrations of the solids (e.g., the $Al_2O_3$, $SiO_2$, and carbon) in the SiAlON precursor suspension was adjusted with deionized water to obtain between a 2.5% and a 3.0% weight increase in the fibrous preform. The carbon needled fibrous preform was placed in a vacuum tank and the SiAlON precursor suspension was transferred into the tank. Following drying, the fibrous preform containing the targeted amount of $Al_2O_3$, $SiO_2$ and carbon was heat treated under nitrogen to temperatures between 1100° C. and 1500° C. (between 2012° F. and 2732° F.) to initiate transformation of precursors into SiAlON particles. Following a first pyrolytic carbon infiltration and suitable heat treatment the partially densified fibrous preform was infiltrated with a SiAlON precursor suspension as described above (e.g., 30.3%, by weight, $Al_2O_3$ in the form of NYACOL® AL 27, 36.0%, by weight, $SiO_2$ in the form of LUDOX® CL, and 33.7%, by weight, carbon black) to deposit a similar quantity of SiAlON particles in the partially densified preform. After drying and heat treating under nitrogen to temperatures between 1100° C. and 1500° C. (between 2012° F. and 2732° F.), the infiltrated fibrous preform was submitted to further pyrolytic carbon densification and suitable heat treatments.

Example 2

A SiAlON precursor suspension, as described in Example 1, was prepared but with a solid concentration of the SiAlON precursor suspension being approximately twice the solid concentration of the SiAlON precursor suspension in Example 1. A fibrous preform was infiltrated the SiAlON precursor suspension using the same process as described in Example 1. Following drying, the fibrous preform containing approximately twice the targeted amount of $Al_2O_3$, $SiO_2$, and carbon, as compared to Example 1, was heat treated under nitrogen to temperatures between 1100° C. and 1500° C. (between 2012° F. and 2732° F.) to initiate transformation of precursors into SiAlON particles. The preform was subsequently subjected to pyrolytic carbon densification and suitable heat treatments. In this regard, unlike Example 1, Example 2 did not include a SiAlON precursor suspension infiltration after partial densification.

Example 3

A SiAlON precursor suspension of $Al_2O_3$, $SiO_2$ and carbon black was prepared with the following composition: 38.3%, by weight, $Al_2O_3$ in the form of NYACOL® AL 27, 42.0%, by weight, $SiO_2$ in the form of LUDOX® CL, and 20.0%, by weight, carbon black. The concentrations of the solids (e.g., the $Al_2O_3$, $SiO_2$, and carbon) in the SiAlON precursor suspension was adjusted with deionized water to obtain an approximately 8.0% weight increase in the fibrous preform. A fibrous preform was infiltrated the SiAlON precursor suspension using the same process as described in Example 1. Following drying, the fibrous preform was heat treated under nitrogen to temperatures between 1100° C. and 1500° C. (between 2012° F. and 2732° F.) to initiate transformation of precursors into SiAlON particles. The preform was subsequently subjected to pyrolytic carbon densification and suitable heat treatments. In this regard, unlike Example 1, Example 3 did not include a SiAlON precursor suspension infiltration after partial densification.

Example 4

A SiAlON precursor suspension was prepared by combining DURAZANE® 1800, hexane, and $Al_2O_3$ particles in the form of AKP-50 from Sumitomo. The weight ratio of preceramic polysilazane polymer to $Al_2O_3$ equaled to 1.2 to 1.0. The amount of hexane was selected such that the weight increase of the fibrous preform was approximately 7.0%. After infiltration and drying, the fibrous preform was subsequently pyrolyzed to 1500° C. (2732° F.), for one hour in the presence of nitrogen. The preform was subsequently subjected to pyrolytic carbon densification and suitable heat treatments. In this regard, unlike Example 1, Example 4 did not include a SiAlON precursor suspension infiltration after partial densification.

Example 5

A SiAlON precursor suspension was prepared by combining DURAZANE® 1800, hexane, and $Al_2O_3$ particles in the form AEROXIDE® Alu C from Evonik Industries. The weight ratio of the preceramic polysilazane polymer to $Al_2O_3$ was equal to 3.0 to 1.0. The amount of hexane was selected such that the weight increase of the carbon preform was approximately 5.0%. Following drying, the fibrous preform was subsequently pyrolyzed to 1500° C. (2732° F.) for one hour in nitrogen. Following a first pyrolytic carbon infiltration and suitable heat treatment the partially densified fibrous preform was infiltrated with a SiAlON precursor suspension as described above (e.g., a SiAlON precursor suspension containing DURAZANE® 1800, hexane, and $Al_2O_3$ particles in the form AEROXIDE® Alu C from Evonik Industries). The part is subsequently pyrolyzed to 1500° C. (2732° F.) for one hour in nitrogen and submitted to further pyrolytic carbon densification and suitable heat treatments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method Step in the present disclosure is intended to be dedicated to the public regardless of whether the element, component, or method Step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A method of making a carbon-carbon composite, comprising:
    forming a Silicon-Aluminum-Oxygen-Nitrogen (SiAlON) precursor suspension by combining an aluminum source, a positively charged silicon source, and a carrier fluid;
    infiltrating a fibrous preform with the SiAlON precursor suspension;
    performing a SiAlON forming heating treatment on the fibrous preform to form SiAlON particles; and
    densifying the fibrous preform by chemical vapor infiltration (CVI) to form a densified fibrous preform.

2. The method of claim 1, wherein the aluminum source comprises alumina ($Al_2O_3$) and is positively charged.

3. The method of claim 2, wherein the silicon source comprises silica ($SiO_2$) having a thin film of positively charged aluminum oxide.

4. The method of claim 3, wherein the SiAlON precursor suspension further comprises carbon black.

5. The method of claim 1, wherein the silicon source comprises colloidal silica ($SiO_2$) and the aluminum source comprises colloidal alumina ($Al_2O_3$).

6. The method of claim 1, wherein performing the SiAlON forming heating treatment on the fibrous preform comprises heating the fibrous preform in a presence of nitrogen gas and at a temperature of between 1100° C. and 1600° C.

7. A method of making a carbon-carbon composite, comprising:
    partially densifying a fibrous preform;
    infiltrating the fibrous preform with a first Silicon-Aluminum-Oxygen-Nitrogen (SiAlON) precursor suspension having an aluminum source, a positively charged silicon source, and a carrier fluid;
    performing a first SiAlON forming heating treatment on the fibrous preform; and
    densifying the fibrous preform to form a fully densified fibrous preform.

8. The method of claim 7, further comprising:
    performing a first heat treatment on the fibrous preform prior to partially densifying the fibrous preform; and
    performing a second treatment on the fully densified fibrous preform.

9. The method of claim 7, further comprising infiltrating the fibrous preform with a second SiAlON precursor suspension prior to partially densifying the fibrous preform.

10. The method of claim 9, further comprising performing a second SiAlON forming heating treatment on the fibrous preform after infiltrating the fibrous preform with the second SiAlON precursor suspension and prior to partially densifying the fibrous preform.

11. The method of claim 7, further comprising forming the first SiAlON precursor suspension by combining the aluminum source, the positively charged silicon source, and a carbon source.

12. The method of claim 11, wherein the silicon source comprises silica ($SiO_2$) having a thin film of positively charged aluminum oxide.

13. The method of claim 12, wherein the silicon source comprises colloidal silica ($SiO_2$), the aluminum source comprises colloidal alumina ($Al_2O_3$), and the carbon source comprises carbon black.

* * * * *